UNITED STATES PATENT OFFICE.

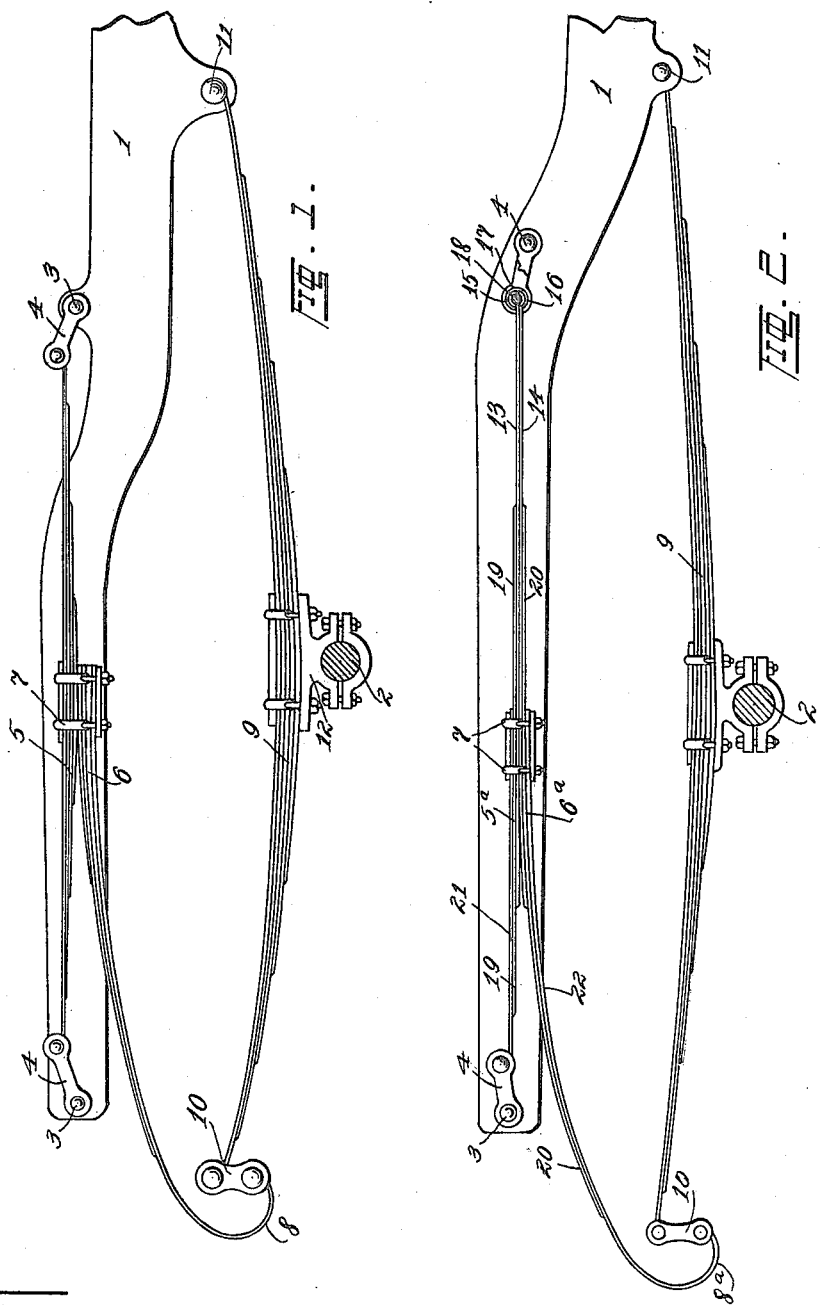

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

1,141,194.

Specification of Letters Patent.

Patented June 1, 1915.

Application filed January 13, 1913. Serial No. 741,640.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and has for its general object to provide a spring construction which will secure ease of riding alike under light and heavy loads.

It is a well known fact that springs, as ordinarily designed and constructed, if resilient and responsive under light loads are incapable of carrying heavy loads, at least without continual danger of fracture, and that, if capable of successfully carrying heavy loads, are stiff and unyielding under light loads. Numerous attempts have been made by spring makers to design and construct springs capable of securing the necessary qualities of strength and ease of riding, but, so far as I am aware, these attempts have been attended with but indifferent success. By the construction illustrated herein, I am enabled to secure the foregoing results in a particularly efficient manner and in a comparatively simple and economical construction.

In the drawings forming part hereof, Figure 1 represents a side elevation of a spring constructed in accordance with my invention, the spring being applied to the side frame of an axle of a vehicle, and the axle being shown in section; and Fig. 2 represents a similar view of another form of my spring, similarly applied.

Describing the various parts herein by reference characters and with particular attention to Fig. 1, 1 denotes the side frame of a vehicle and 2 the axle thereof. Projecting laterally from the side frame are the pins or bolts 3 forming pivotal supports for a pair of shackles indicated at 4. Extending between the upper ends of the shackles there is a spring section 5, said spring section being shown as constructed of a plurality of leaves of varying length, but the section being substantially straight, or devoid of camber, and having its opposite ends connected to the swinging ends of the shackles. It will be observed (and it is an important feature of my invention) that the shackles project almost directly toward each other, making but a slight angle with a line joining the pins or bolts 3. The spring section 5 is a comparatively light section, being shown as composed of only four leaves. This spring section is secured to a second spring section 6, by means of clips 7, said sections being secured back to back and the lower section 6 being preferably a quarter-elliptic spring one end whereof 8 is a scroll extending around and flexibly connected to the adjacent end of the lower spring member 9 by means of the shackle 10. The spring member 9 is shown as a semi-elliptic spring having the end opposite the shackle 10 connected to the side frame 1, as by means of a pin 11. The spring member 9 is clipped to a spring seat 12 mounted on the axle 2.

It will be noted (and this is also an important feature in the realization of the objects of my invention) that the lower spring member 9 is stronger and stiffer than either of the two sections 5 and 6 which comprise the upper member. In the drawing, the upper member is shown as consisting of two sections having four leaves each, while the lower member consists of a single section having five leaves.

In operation, we may assume that the vehicle wheel encounters an obstacle, moving the axle 2 upwardly. The upward thrust is transmitted by the section 6 against the center of the section 5, while the section 5 is itself bowed upwardly, forming an arcuate connection between the ends of the shackles 4. The shock is absorbed by the upward yielding of the center of the spring 5 and dissipated throughout its length, such upward movement being of limited extent because of the fact that this spring section normally forms a tension device extending in a substantially straight line between the opposed ends of the shackles but free to bow or yield at the center to a limited extent. During this "arcing" of the spring section 5 by the upward deflection of its center, there is a dissipation of the shock throughout the length of this spring section and a failure to transmit the same to the vehicle, as would be the case were the center of the spring rigidly connected to the frame. Under heavier shock and under heavier load the limit of the upward deflection of the spring section 5 will soon be reached and the spring section 6 will then elongate and cushion against the section 5, the latter section forming a reinforcement for the elongating section 6; the greater the increase in load, the greater the thickness and strength of the upper section through the increased bearing between the two sections, shortening the length of the yielding ends of such sections.

In Fig. 2, the construction of the spring frame 1, shackles 4, axle 2, and lower spring member 9 is identical with that of the like-designated parts in Fig. 1. The upper member, however, is a composite spring formed as a single spring at one end and a double spring at its other end, the single spring end being common to both sections of the double spring. The upper member is shown as constructed specifically as follows:—Two plates or leaves 13 and 14 are provided each with a half eye at one end, designated by the numerals 15 and 16, respectively. These half eyes are inclosed within a slotted bushing 17 and receive therewithin the shackle pin 18. The upper of these leaves, 13, constitutes a back plate for the upper spring section $5^a$, while the lower of these leaves, 14, constitutes a back plate for the lower spring section $6^a$. 19 and 20 denote spring plates, located respectively above and below the plates 13 and 14 and each having one end interposed between the center of the composite spring and the half eyes 15 and 16 while the opposite ends of the plates 19 and 20 extend beyond the ends of the plates 13 and 14 and constitute the second plates for the spring sections $5^a$ and $6^a$. The plates 21 and 22 of the springs $5^a$ and $6^a$ correspond to the main plates of an ordinary spring but are only of sufficient length to enable them to be engaged by the clips 7. The plate 22 is provided with a scroll end $8^a$ connected to the adjacent end of the spring member 9 by a shackle 10.

While the construction of the modification shown in Fig. 2 is specifically different from that shown in Fig. 1, the operation of the two constructions is substantially the same. In both forms of the invention, the upper spring section forms a substantially straight line between the opposed ends of the shackles 4, and the shackles are directed toward each other in nearly a straight line, whereby the upper spring section constitutes a flexible tension device which is capable of yielding upwardly and downwardly to a limited extent to absorb the blows and shocks transmitted thereto. When the limit of "play" of the central portion of this tension device has been reached, then the spring section $6^a$ can cushion and elongate against the section $5^a$. Within the limits of this "play," the shocks imparted to the vehicle are suspended or dissipated throughout the length of the tension spring section and are not transmitted to the vehicle frame. In both forms of the invention, as the load increases the effective weight or thickness of the upper spring member automatically increases by the increased bearing of the two sections thereof against each other, and this upper member of the spring is automatically thickened and strengthened in proportion to the load. This construction secures the requisite resilience under light loads and the requisite strength under heavy loads, both of which conditions are necessary in order to obtain easy riding under all ordinary conditions of use.

A further advantage of the construction shown herein resides in the manner of mounting the upper spring sections 5 and $5^a$ on the side frame. The shackles are carried on pins or bolts projecting laterally from the frame and a flexible tension device connects the said shackles and connects the frame to the spring. By this manner of connecting the springs to the side frame, objectionable "side-sway" is practically eliminated. Furthermore the spring is connected to the vehicle frame at its ends, and not at the middle. This gives an increased effective bearing between the spring and the frame which is substantially equal to the length of the spring section 5, $5^a$, and eliminates the leverage existing between the spring bracket and the frame in ordinary constructions and which leverage tends to tear the bracket from the frame under the movement of the vehicle.

In both forms of the invention disclosed herein, the upper spring section or tension device is shown as substantially straight, the purpose being to provide a spring section or tension device which is substantially non-extensible or non-elongating. While other forms of springs might secure this result, it is obvious that a substantially straight spring section is the simplest form for realizing this result, and I have selected the straight form of spring section for the exemplification of my invention disclosed herein. Furthermore, while I show the shackles as extending toward each other in nearly a straight line, this arrangement is not absolutely necessary, as the shackles might be substantially vertical. I prefer the arrangement shown herein, however, because of the fact that the tension spring section will more quickly assume its reverse curve or arcing with the shackle connections shown herein than if the shackles were substantially vertical.

Having thus described my invention, what I claim is:—

1. The combination, with a vehicle frame and axle, of a spring secured to the axle, a tension spring substantially non-deflectably connected at its ends to the frame and having a limited play, and a spring connected to the last mentioned spring and to the first mentioned spring.

2. The combination, with a vehicle frame and axle, of a spring connected to the axle, a tension spring substantially non-deflectably connected at its ends to the vehicle frame and having a limited play, and a spring connected to the body of the second spring, back-to-back, and having an end connected to the first-mentioned spring.

3. The combination, with a vehicle frame and axle, of a semi-elliptic spring secured to the axle, a tension spring substantially non-deflectably connected at its ends to the frame and having a limited play, and a spring intermediate of the other springs and having its body connected to the body of the last mentioned spring and an end connected to an end of the first mentioned spring.

4. The combination, with a vehicle frame and axle, of a spring connected to the axle, a tension spring substantially non-deflectably connected at its ends to the frame, and a spring connected to the central portion of the latter spring and having an end extending around and flexibly connected to an end of the first mentioned spring.

5. The combination, with a vehicle frame and axle, of a semi-elliptic spring secured to the axle, a tension spring substantially non-deflectably connected at its ends to the frame, and a spring secured to the central portion of the second spring back-to-back and having an end flexibly connected to an end of the first mentioned spring, the third spring being lighter and more yielding than the first mentioned spring.

6. The combination, with a vehicle frame and axle, of a semi-elliptic spring connected to the axle, shackle-supporting pins projecting laterally from the frame, shackles on said pins, a substantially non-extensible spring supported by said shackles, the parts being so proportioned that the shackles project toward each other in substantially a straight line, and a spring secured to the last mentioned spring and having an end flexibly connected to the first mentioned spring.

7. The combination, with a vehicle frame and axle, of a spring connected to the axle, a tension device connected at opposite ends with the frame, and a spring secured to the central portion of said tension device and connected to the first mentioned spring.

8. The combination, with a vehicle frame and axle, of a spring connected to the axle, a tension device substantially non-deflectably connected at its ends to the frame and having a limited play, and a spring having its body secured to the central portion of said device and having an end flexibly connected to the first mentioned spring.

9. The combination, with a vehicle frame and axle, of a spring connected to the axle, pins projecting laterally from the frame and rigidly connected thereto, a substantially non-extensible tension member connected to said pins, and a spring connected to the tension member intermediate of the ends of said member and also connected to the first mentioned spring.

10. The combination, with a vehicle frame and axle, of a spring secured to the axle, a tension spring which is substantially non-deflectably connected by its ends to the vehicle frame, and a spring interposed between and connecting the first mentioned spring with the second spring, with its back presented toward the second spring and arranged to bear progressively against the second spring as the axle and frame approach each other and whereby the second spring forms a reinforcement for the elongating second spring.

11. The combination, with a vehicle frame and axle, of a semi-elliptic spring connected to the axle, a tension spring susbtantially non-deflectably connected by its ends to the vehicle frame, and a spring connected to the intermediate portion of the second spring back-to-back and having an end connected to the first mentioned spring, the first mentioned spring being heavier and stronger than either of the other springs alone.

12. The combination, with a vehicle frame and axle, of a lower spring member secured to the axle, an upper spring member comprising a spring section the opposite ends of which are connected to the frame, and a spring section connected back-to-back to the first mentioned section, the first and second sections having a common end comprising a plurality of leaves, and a flexible connection between an end of the lower section and an end of the lower spring member.

13. The combination, with a vehicle frame and axle, of a lower spring member secured to the axle, an upper spring member comprising a substantially straight spring section the opposite ends of which are connected to the frame and a scroll-spring section connected back-to-back to the first mentioned section, the first and second sections having a common end comprising a plurality of leaves, and a flexible connection between an end of the lower section of such upper member and an end of the lower member.

14. The combination, with a vehicle spring and axle, of a lower semi-elliptic spring member connected to the axle, and an upper spring member connected to the frame and to the lower member, the upper spring member comprising a plurality of plates which are connected together, the plates on one side of the point of connection forming half of a single spring having its end connected to the frame and the plates on the other side of the connection forming diverging half springs, the upper half spring being connected to the frame and the lower half spring to the first mentioned spring member, the first or lower spring member being heavier and less resilient than the upper spring section which is connected therewith and the two diverging spring sections being so arranged that the lower section will cushion against and extend its bearing upon the first section.

15. The combination, with a vehicle frame and axle, of a spring connected to said axle, a tension spring non-deflectably connected to the frame at its ends and capable of yielding at its intermediate portion, and a spring connected to the intermediate portion of said device and having an end connected to the first spring.

16. The combination, with a vehicle frame and axle, of a semi-elliptic spring connected to the axle, shackle-supporting pins projecting laterally from the frame, shackles on said pins projecting toward each other, a substantially non-extensible spring supported by said shackles, and a spring secured to the last mentioned spring and having an end flexibly connected to the first mentioned spring.

In testimony whereof, I hereunto affix my signature in the presence of two witnesses.

MICHAEL M. McINTYRE.

Witnesses:
W. E. PERRINE,
P. A. CONNOLLY.

Copies of this patent may be obtained for five cents each, by addressing the "Commissioner of Patents, Washington, D. C."